March 17, 1925.                     1,530,119
E. S. HOGSHEAD ET AL
TIRE CHAIN
Filed Oct. 4, 1923
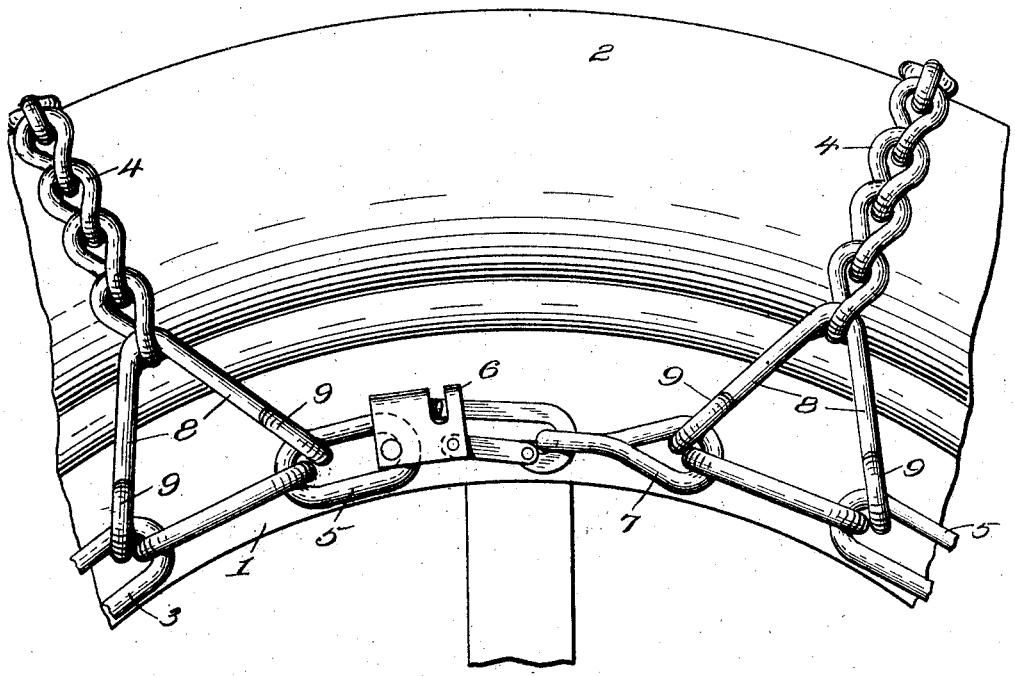
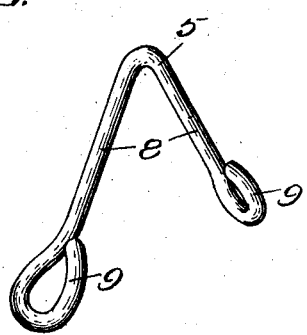
Witness
F. C. Gibson.
Inventor
E. S. Hogshead and
R. C. Hogshead.
By Townshend + Townshend,
Attorney Patented Mar. 17, 1925.

1,530,119

UNITED STATES PATENT OFFICE.

EDGAR S. HOGSHEAD AND RODNEY C. HOGSHEAD, OF MOUNT SOLON, VIRGINIA.

TIRE CHAIN.

Application filed October 4, 1923. Serial No. 666,494.

*To all whom it may concern:*

Be it known that we, EDGAR S. HOGSHEAD and RODNEY C. HOGSHEAD, citizens of the United States, residing at Mount Solon, in the county of Augusta and State of Virginia, have invented certain new and useful Improvements in a Tire Chain, of which the following is a specification.

The invention relates to tire chains and the primary object thereof is the provision of a tire chain which will effectively prevent skidding, and which will automatically bind on the tire to tighten the side links when strain is placed on the cross chain.

Another object is the provision of a novel connector between the side chains and cross chains.

With these objects in view, and such others as will be apparent from the description, the invention resides in the novel construction, combination and arrangement of parts hereinafter described and claimed, and shown in the accompanying drawings, of which:—

Figure 1 is a side elevation of a portion of a wheel and tire equipped with the chain, and Figure 2 is a perspective of the connector.

The tire chain is shown as applied to a wheel 1 carrying the usual pneumatic tire 2 and includes the conventional steel link side chains 3, one only of which is shown, and cross chains 4. One end link of the side chains, as at 5, is coupled with a suitable chain fastener 6, preferably of the type covered in our United States Patent No. 1,414,467, May 2, 1922, and the opposite end link 7 is twisted upon itself to engage the lever of the fastener.

The cross chains 4 are connected at each end to the side chains 3 by means of connectors 5 consisting of V shaped steel members of the same relative thickness in cross section as the links of the chain. These connectors are passed through the end links of each cross chain and engage same at the apexes. The arms 8 of each connector are bent upon themselves at their ends to provide eyes 9, each of which is passed through adjacent links of the side chains spaced by an intermediate link with which the arms 8 are not connected. These intermediate links form in effect the base of a triangle completed by the arms of the connectors, which base however, has no connection with the arms. The result attained by this construction, and which is an essential element of the invention, is that the lower ends of the arms 8 will be at all times spaced apart the distance of the length of the intermediate link.

Heretofore in this art, chains have been employed in which substantially the same connector is used but with the ends connected to succeeding links, or to links spaced by two or more intermediate links. In the present invention the ends of the connector arms are secured to links spaced apart by only one intermediate link.

In operation, as strain is brought on the cross chains, the connectors will be drawn toward the periphery of the tire. As the intermediate links of the side chains absolutely prevent the arms converging at their ends, the resultant action will be the twisting of the substantially rigid triangles formed by the arms of the connectors, and the spaced links of the side chains, whereby the side chains will be considerably tightened and effectively caused to bind on the tire to prevent slipping. The side chains are normally tensioned when applied and this prevents the links connected with the arms 8, sliding to any extent. This allows the intermediate links to act as a stop to prevent convergence of the arms 8.

While in this preferred form certain details have been illustrated and described, we desire it to be understood that the invention is not limited thereby, but that any changes and modifications may be made in the construction as will fall within the scope of the invention as claimed.

We claim:—

1. A tire chain comprising linked side chains, cross crains, V shaped connectors engaged at their apexes in the ends of said cross chains and secured to links of the side chains spaced by one intermediate link.

2. A tire chain comprising side chains formed of a plurality of connected rigid links, linked cross chains, V shaped members passed through the end links of said cross chains and engaged therewith at their apexes, the ends of the arms of said V shaped members being passed through pairs of links of said side chains spaced apart by single intermediate links and bent to form eyelets for securing said arms to the side chains.

In testimony whereof we affix our signatures.

EDGAR S. HOGSHEAD.
RODNEY C. HOGSHEAD.